Jan. 15, 1952

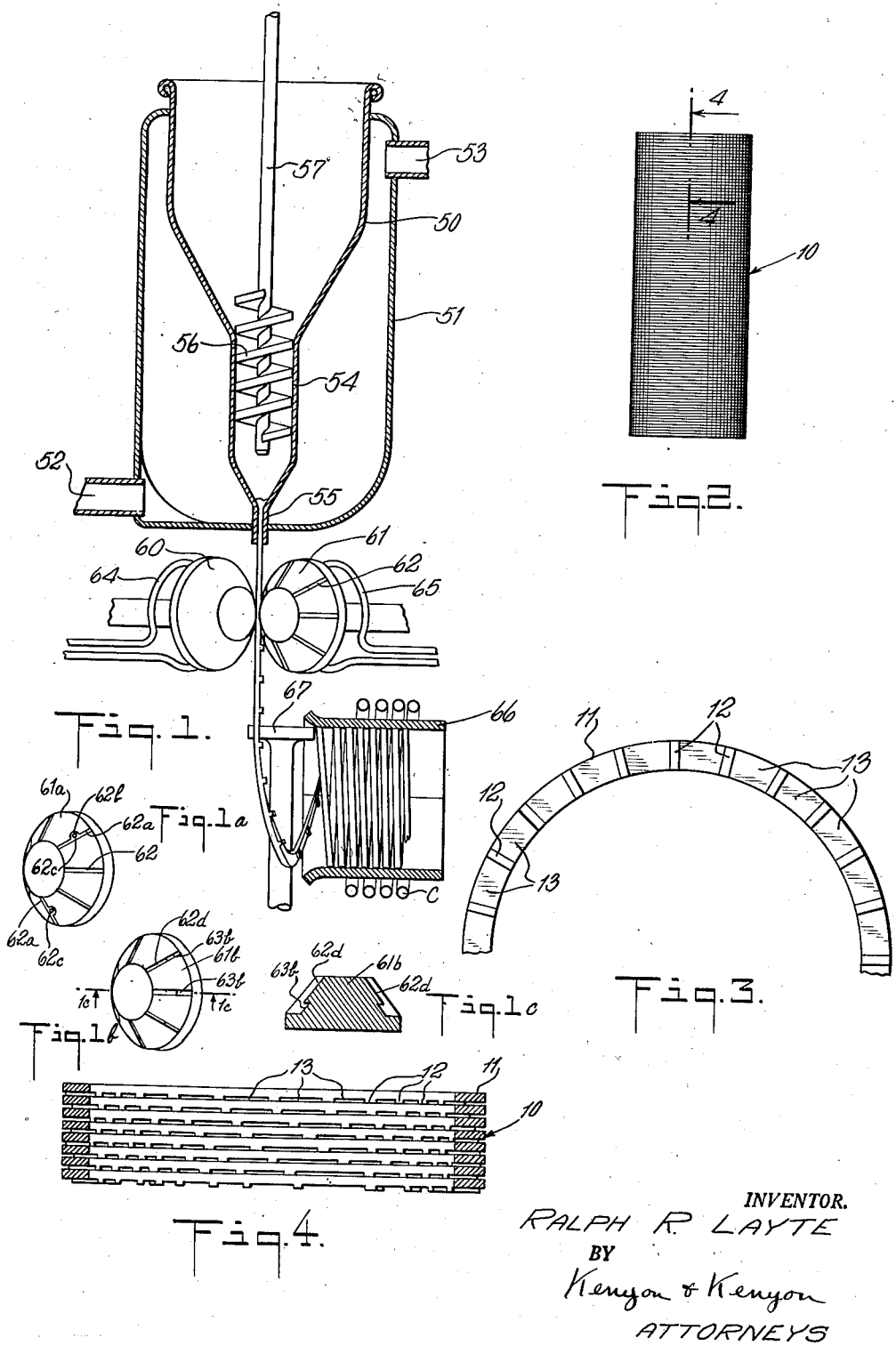

R. R. LAYTE 2,582,340

PLASTIC EDGE TYPE FILTER

Filed March 25, 1948

INVENTOR.
RALPH R. LAYTE
BY
Kenyon & Kenyon
ATTORNEYS

Patented Jan. 15, 1952

2,582,340

UNITED STATES PATENT OFFICE 2,582,340

PLASTIC EDGE TYPE FILTER

Ralph R. Layte, Westfield, N. J., assignor to Purolator Products, Inc., Newark, N. J., a corporation of Delaware Application March 25, 1948, Serial No. 17,084

2 Claims. (Cl. 210—169)

This invention relates to improvements in filters and in methods of making the same.

A principal object of this invention is to provide an edge type filter of plastic material that is self-supporting and does not require a supporting frame.

A further principal object of this invention is to provide novel apparatus and a novel method of making such filters.

A further object of the invention is to provide an inexpensive plastic filter unit of rigid construction capable of withstanding relatively high or low pressures and having a large area of definitely sized filtering interstices within small compass and requiring a minimum of plastic in relation to effective filtering surface and with which the need for a supporting frame is eliminated.

Another object of the invention is to provide a novel process of producing such filters rapidly, efficiently and inexpensively.

A filter unit embodying the invention consists of a slotted plastic cylinder or tube composed of a helix of plastic ribbon of minute thickness having its wide faces normal to the axis of the helix, and means to space the turns of the helix to provide filtering slots, the spacing means preferably consisting of projections of predetermined height extending from one face of the ribbon. Preferably, the ribbon is preformed with definite uniform curvature, whereby without any deforming or straining, it naturally assumes helical shape with its wide faces transverse to the axis of the helix and with the turns of the helix spaced apart to a known distance by the said projections. The turns of the ribbon are definitely spaced to provide a succession of apertures or slots which are of uniform predetermined gauge or filtering width, corresponding substantially to the height of the projections and which may be so extremely narrow as to make the filter unit effective to remove from fluid passing through it all but the most minute particles. Due to the extreme thinness of the ribbon, the total area of the apertures or slots, i. e. the effective filtering area, forms a much larger proportion of the total area of the filter element than in previously known filters of rigid construction and therefore fluid to be filtered may be passed through the filter unit at a relatively high rate.

Although the plastic ribbon is uniformly curved or shaped so that it may easily be shaped or wound on edge in the form of a helix without any deforming or straining and will invariably tend to maintain its helical shape except for a tendency to bend due to its thin section, the tendency of the coils to slide sideways eccentrically from its major axis and then tendency to open up as would a too light spring upon the application of an elongating force must be eliminated. Means are provided to effect this.

The manner of preforming the ribbon is a modification of that described, for example, in Liddell Patent 2,042,537 granted June 2, 1936, the necessary modifications existing because of the use of plastic material rather than of metal for the ribbon.

Masses, quantities of or crystals of plastic material such as vinylidene chloride resins, polyvinyl butyral resins, nylon resins, viny chloride acetate resins are used. These materials, in addition to the various thermosetting resins, may be used in the case of oil filters. In the cases where corrosion or dissolving by the filtrate is not of importance, e. g., air, the selection of the material would be governed by the air temperature. In the case of corrosive liquids, such as acids or alkalis, the materials chosen would be those having good resistance to these substances. Hence, it may be stated that the choice of material to be used in the fabrication of the filter medium would be dependent upon the use for which it is intended and governed by the properties of these resinous materials. Masses, quantities of or crystals of materials just listed are placed in a hopper, heated to temperatures in prescribed ranges and by means preferably of a feed screw the heated plastic is extruded or forced under pressure and under heat through an extrusion nozzle of desired cross sectional shape to produce plastic wire or ribbon having the desired round, rectangular or trapezoidal cross section.

The plastic wire is then passed between rollers shaped and formed substantially in the manner described in the said Liddell patent, forming a plastic edge type filter ribbon simular to the metallic filter ribbon of said Liddell patent. The rollers are heated, for example, by electric induction coils or by other ways to provide confined or directed heat in said rollers within prescribed temperature ranges to soften the thermoplastic materials and to polymerize the thermal setting resinous materials to a point just prior to final polymerization.

The ribbon is then in formed helices guided into a split ring type of sleeve for retaining the helices or turns in alignment and concentricity, and the adjacent coil edges are forced together by a roller or other appropriate means and by friction of the sleeve. The sleeve is appropriately heated as by electric induction or in other ways within prescribed temperature ranges to polymerize the plastic material of the coils to their final stage (in the case of thermal setting resins) and to soften such coils so that the plastic materials (of whatever type used) can be permanently joined together at the contact points of the ribs or risers or one coil or helix and the back face of the adjoining coil or helix.

The shape of the plastic ribbon may be modified in formation to provide additional means for aligning the coils and maintaining their alignment in the finished product.

If desired, other ways of joining the coils can be provided. Likewise, if desired, the coils need not be joined so that they can be separated for cleaning purposes.

The filter structures provided by this invention are stronger, more economical to make and are resistant to the deleterious effects of acids, caustics, etc., dependent upon the resin or plastic used.

Other objects, novel feature and advantages of the invention will be apparent from the following specification and accompanying drawing wherein:

Fig. 1 is a vertical, partially schematic diagram, partially in section of apparatus for producing edge type plastic filter elements embodying the invention;

Fig. 1a is a perspective view of a modified form of roller for shaping a modified form of ribbon;

Fig. 1b is a similar perspective view of another modified form of roller for shaping a further modified form of ribbon;

Fig. 1c is a section taken along line 1c—1c of Fig. 1b;

Fig. 2 is an elevational view of one form of filter element embodying the invention;

Fig. 3 is an enlarged bottom plan view of one of the helices or coils forming the filter;

Fig. 4 is an enlarged partial section taken along line 4—4 of Fig. 2;

Figure 5:
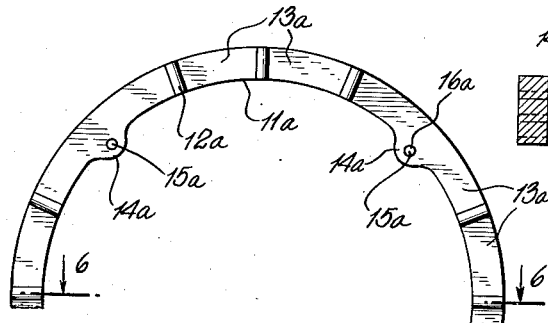
Fig. 5 is a view similar to that of Fig. 3 of a modified form of coil helix or turn.

Referring now to the illustrated forms of the invention shown more specifically in Figs. 2–4 inclusive, the filter element comprises a slotted cylinder 10 formed from a substantially flat plastic ribbon 11 of minute thickness and which is provided on one face with spaced transverse ribs 12 all of which extend a similar distance outwardly from one of the faces of the ribbon, which distance is suited to the purposes for which the filter is to be used so that the resulting apertures, slits or slots 13 are definitely sized to permit the desired flow and to remove all particles of greater dimension than the height of the said ribs from the fluid being filtered. If desired, the ribbon 11 can have the tapering cross-section described in the Liddell patent and the ribs 12 could have corresponding shape.

In the case of filters for lubricating oil of an internal combustion engine, the ribs 12 preferably should be upwards of one thousandth of an inch in height and not more than three thousandths, in order to remove the harmful abrasives and still allow the substantially clean oil to flow through the filter unit at such rate that the filter will be of practical utility. In other instances the range of heights of the ribs may lie between .0005 inch to .030 inch.

The dimensions of the ribbon are such as to provide a cylinder having strength to withstand the pressure and the service to which it is to be subjected.

The practical difficulties of preparing the filter unit 10 from ribbon 11 are avoided by forming a very thin ribbon but preshaping it with definite uniform curvature so that it naturally tends to assume helical shape with its faces in contact and transverse to the axis of the helix.

Furthermore, a cylindrical filter unit having the large ratio of effective filtering area to total area of filtering element contemplated by this invention would be at least one hundred times larger in diameter than the thickness of the ribbon (in direction parallel to the axis of the cylinder). In such arrangement, the ribbon, if bonded at the ribs 12, has sufficient rigidity to hold the successive turns of the helix in alignment without the aid of auxiliary aligning or supporting means.

Figure 6:
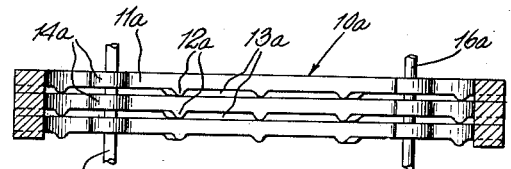
Fig. 6 is an enlarged partial section similar to that of Fig. 4 of a filter element embodying coil helices or turns of Fig. 5.
Figure 7:
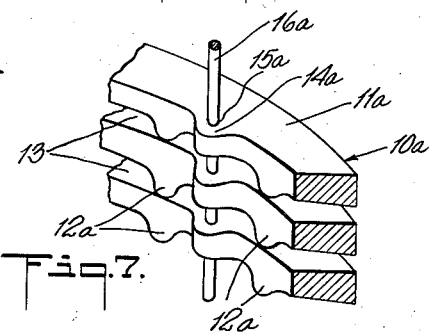
Fig. 7 is an enlarged fragmentary perspective view of a portion of a filter element embodying the coil helices or turns of Fig. 5.

In an alternative form of element 10a as shown in Figs. 5 to 7 inclusive, the plastic ribbon 11a, is utilized for forming the filter element 10a. This ribbon 11a may be provided in addition to the ribs 12a with inwardly projecting lugs 14a arranged at approximately spaced apart points of the internal edge of the ribbon 11a, or, if desired, arranged to project externally (not shown) of the outer edge of the ribbon 11a. Each of these lugs 14a is provided with a hole 15a. In this embodiment the tapered cross section of the ribbon is shown in Fig. 7. Such tapering is optional, however.

When ribbon 11a is formed into helices which are arranged in contact with each other with the ribs 12a abutting the unribbed adjacent surfaces of adjacent helices, lugs 14a and the bores 15a of various adjacent helices or turns are arranged to lie axially aligned so that rigid supporting rods 16a may be inserted and temporarily or permanently retained in the aligned bores 15a both during and subsequent to the permanent junction of the ribs 12a to adjacent surfaces of the adjacent helices. With such construction, the spacing 13a provided between adjacent helices is arranged to be substantially the same as that of spaces 13 between the helices of the first described modification of Figs. 3 to 4 inclusive.

Figure 8:
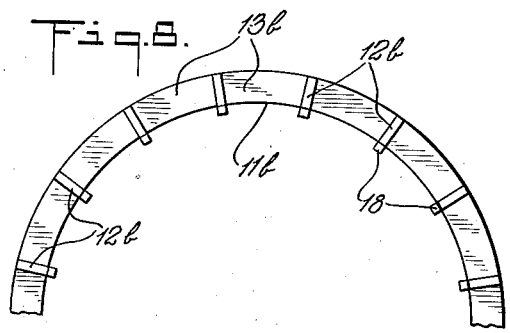
Fig. 8 is a bottom plan view of a further modified form of coil helix or turn.
Figure 9:
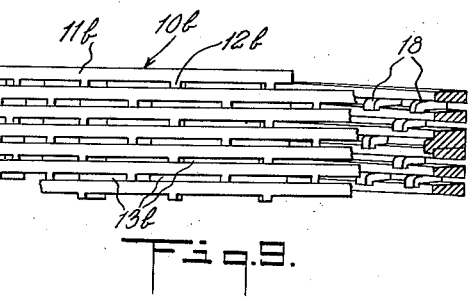
Fig. 9 is a fragmentary elevation partially in section of a filter element embodying coil helices or turns of Fig. 8.
Figure 10:
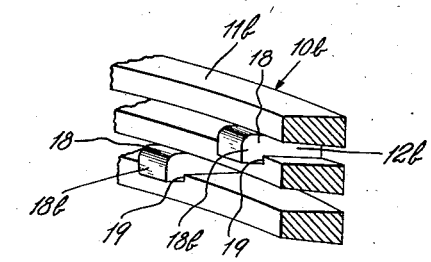
Fig. 10 is an enlarged fragmentary perspective view of a portion of a filter element embodying coil helices or turns of Fig. 8.

In another embodiment shown in Figs. 8 to 10 inclusive, the filter element 10b consists of the plastic ribbon 11b. That ribbon 11b in addition to having the ribs 12b, is further modified by providing lateral inwardly or lateral outwardly extending lugs 18 that are shaped at their ends 18b to provide shoulders 19 as seen in Fig. 10. The tapered cross section of the ribbon is optional. With the construction of this figure, when the helices are pressed together to form the filter element 10b, the inner edges of adjacent helices or turns engage respective shoulders 19 of projections 18b provided on the preceding helices to prevent lateral displacement of the said helices. Such arrangement materially increases the strength of such filter elements 10b. The spacing 13b between adjacent helices is substantially the same as that 13 between the helices of the first modification of Figs. 2–4.

Figure 11:
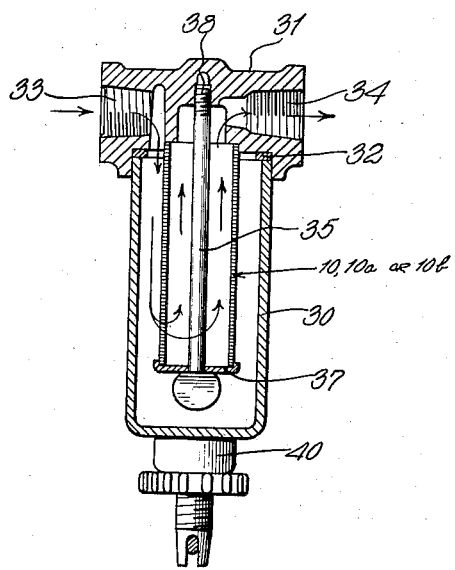
Fig. 11 is a vertical section of one form of a filter unit in which filter elements of the invention may be employed.

Plastic filter elements embodying the invention may be used in various types of filter structures. For example, in the structure shown in Fig. 11, the hollow casing 30 is provided with a casing head 31. A sealing gasket 32 provides an effective seal at the joint between the head 31 and the casing 30. An inlet passage 33 serves to admit oil or other fluid to be filtered to the casing 30 and outlet passage 34 permits the filtered liquid to flow out of the casing. A plastic filter element 10, 10a or 10b is secured in place in the axial direction of casing 30, for example, by an axially extending mounted bolt or member 35 which is headed at one end to engage a cap 37 and threaded at 38 to screw into the head 31. The cap 37 fits over one end of the filter unit 10, 10a, or 10b and the other end of the latter abuts the head 31 about a portion of the outlet 34. The oil or other liquid to be filtered flows to casing 30 through inlet 33, downwardly in the casing, laterally through the interstices 13, 13a or 13b of the filtering element 10, 10a or 10b and upwardly to the outward flow passageway 34 as denoted by the arrows in Fig. 11. The flow direction may be reversed. Dirt is collected on the outer or inner surface of the supported filtered element 10 or 10a or 10b depending upon flow direction. The united head 31 and casing 30 bearing the filter element 10, or 10a or 10b are supported by a retaining yoke 40 which serves to hold the head and casing in joined condition. These parts may be readily separated for inspection and cleansing or replacement of the filtering unit.

The method of forming the filtering elements comprising the invention is shown schematically in Fig. 1. Therein a container or hopper 50 is provided with a heating jacket 51 through which by way of inlet 52 and outlet 53 an appropriate heating medium may be circulated to provide temperatures in the range of 200° F. to 500° F. depending upon the resin used. If vinylidene chloride resin (Saran) is used the temperature range is 250° F. to 400° F. This heating medium may be steam or hot gaseous products of combustion or any other desirable medium. The hopper 50 is narrowed in a portion 54 and the portion 54 terminates in an extrusion nozzle 55. The extrusion nozzle 55 has desired cross-sectional shape so that any material extruded therefrom will have the same desired cross-sectional shape.

A feed screw 56 whose drive shaft 57 is appropriately driven operates in the narrow portion 54 of the hopper 50. This screw 56 acts to feed the contents of the hopper 50 to the extrusion nozzle 55 and to extrude such contents therefrom. Other extrusion means may be employed. The material inserted into the hopper 50 comprises masses, quantities or crystals of the plastic material hereinbefore described which soften and unify in the hopper under the heat provided by the medium in the jacket 51.

This softened material is fed by the feed screw 56 and extruded through the nozzle 55 as a continuous plastic wire. This wire is fed directly from the nozzle 55 and passes between a pair of cooperating conical rollers 60 and 61. One of these rollers is provided with recesses 62 for forming the spacing projections or transverse ribs 12, 12a or 12b. The passage of the wire between these rollers 60 and 61 which are appropriately heated as by electric induction coils 64 and 65 or in other suitable ways to temperatures ranging from 200° F. to 250° F. for vinylidene chloride resin and 125° F. to 500° F. for other resins mentioned, acts not only to convert the extruded material into a thin flat ribbed ribbon, but, also, gives to it definite predetermined curvilinear shape which causes the formed ribbon to tend to assume the form of a helix as shown in Fig. 3, 5 or 8 with its wide faces in abutting relationship. Preferably the formed ribbon 11, 11a or 11b is guided to a split ring type of sleeve 66 and is moved into the latter by the aid of a guiding roller 67. The friction of the ribbon 11, 11a or 11b against the internal surfaces of the split ring 66 and the action of the guiding roller 67 tends to compress the helices to bring the ribs 12, 12a or 12b of each into abutment with the adjacent unribbed surface of the adjacent helices.

The heat provided by the induction coil 64 and 65 to the rollers 60 and 61 is sufficient to polymerize the plastic material of the ribbon to the point just prior to its final polymerization point or stage. The sleeve 66 is heated either by an induction coil C or in other appropriate ways sufficiently to a temperature ranging from 250° F. to 300° F. for vinylidene chloride resin and 125° F. to 500° F. for other resins mentioned to provide polymerization heat for the material of the helices to polymerize it to its final stage and is, also, sufficiently high to soften the material enough to provide adhesion between abutting ribs and helix surface portions and thereby to effect a permanent joint at the contact points of the ribs on one coil with the back faces of the adjacent coils. If desired, the heating of the sleeve 66 can be made insufficient to effect permanent bonding and instead an appropriate adhesive can be applied to ribs 12, 12a or 12b prior to the entry into the sleeve 66 of the helices bearing such ribs. The heat of the sleeve in such event is made sufficient to polymerize the material of the helices to final stage and also to set the adhesive and thereby provide a permanent bond between the ribs and the back faces of the adjacent coil. The temperature range in such event of the sleeve is from 200° F. to 250° F. for vinylidene chloride resin and 125° F. to 500° F. for others of the resins mentioned.

In the event that it is desired to form filter elements of the forms described in Figs. 5 to 7 or 8 to 10 inclusive, the only replacement necessary is of the roller 61 so that the extruded ribbon passing either between a modified roller 61a (Fig. 1a) or a modified roller 61b (Figs. 1b and 1c) and a roller corresponding to a roller 60 will impart or provide the appropriate projections 14a or 18, 18b and 19 in addition to the ribs 12a or 12b. For example, to provide ribbon of the form shown in Figs. 5–7, various of the depressions 62a of the roller 61a are provided with a lateral recessed bore portion 62b having an island 62c shaped to correspond to the lateral extensions 14a and position of hole 15a so that passage of the extruded material between a roller 60 and a roller 61a will form the lateral projection 14a with holes 15a in addition to the ribs 12a on ribbon 11a.

Similarly, if the ribbon 11b of the third modification is desired, a roller 61b (Figs. 1b and 1c) instead of roller 61 is provided with recesses 62d to form the ribs 12b and in addition these recesses 62d have additional depressions 63b necessary for the direct formation of the portions 18, 18b and the shoulders 19 of the ribs 12b. Substitution either of roller 61a or roller 61b as the case may be for the roller 61 is all that is required to produce the respective ribbons 11a or 11b, instead of ribbon 11.

By the term "helix" as used in the foregoing description and in the appended claims, it is intended to include elements which are substantially cylindrical in form, such for example, as truncated cones and similar shapes.

The structure above described combines the qualities of uniformly fine edge filtration, great structural strength and a high degree of filtering efficiency, that is, a high ratio of effective filtering area to the total area of the filtering unit. The strength and uniformity of filtering qualities of tube filters are herein combined with the high filtering efficiency of a wire screen. The edgewise arrangement of the ribbon on the support combined with the lateral support given to each turn by the adjacent turn through the spaced ribs results in a very strong and rigid construction capable of withstanding pressures entirely outside the range of possibility of wire screens of corresponding filtering fineness and yet having a filtering efficiency comparable with that of wire screens. The efficiency of edge filters is combined with structural strength sufficient to withstand high pressures in an inexpensive and light device which is economical to manufacture and of extreme durability.

While many modifications in form and arrangement may be made without departing from the spirit of the invention, it is apparent that the above described plastic filtering units combine the well known advantages of edge filtration with absolutely uniform predetermined width of the filtering apertures or slots so that rigid construction is effected and the aggregate area of the apertures or slots is large in relation to the total area of the unit and a very great saving in material is effected over other metal filters in relation to the filtering capacity provided.

While specific embodiments of the invention have been described, it will be understood that variations in details and in forms of construction and of details of method within the scope of the claims are contemplated. There is no intention, therefore, of limitation to the exact details shown and described.

What is claimed is:

1. In combination with a casing having an inlet and an outlet, a completely self-supporting filter unit comprising a helix composed of a thin narrow ribbon of plastic material with its width substantially normal to the axis of the helix, spacing ribs extending transversely of the ribbon on a wider face thereof, and aligning lugs integral with said ribs and projecting beyond a thinner face of the ribbon and substantially normal to the said wider face to define shoulders engaging a thinner face of an adjacent helical turn of said ribbon thereby aligning said turns.

2. The device of claim 1 in which the spacing ribs of the ribbon in each turn are permanently bonded to the adjoining face of the adjacent turn.

RALPH R. LAYTE.

REFERENCES CITED

The following references are of record in the file of this patent:

UNITED STATES PATENTS

| Number | Name | Date |
| --- | --- | --- |
| 1,744,510 | Hele-Shaw et al. | June 21, 1930 |
| 1,932,821 | Henkel | Oct. 31, 1933 |
| 1,974,235 | Cammen | Sept. 18, 1934 |
| 2,000,490 | Mandahl | May 7, 1935 |
| 2,042,537 | Liddell | June 2, 1936 |
| 2,188,643 | Laderer | Jan. 30, 1940 |
| 2,257,944 | Fischbein | Oct. 7, 1941 |
| 2,284,787 | Winkler | June 2, 1942 |
| 2,324,838 | Harz et al. | July 20, 1943 |
| 2,330,282 | Hazeltine et al. | Sept. 28, 1943 |
| 2,360,570 | Mattoon | Oct. 17, 1944 |
| 2,375,246 | Kasten | May 8, 1945 |
| 2,489,292 | Hobbs | Nov. 29, 1949 |

FOREIGN PATENTS

| Number | Country | Date |
| --- | --- | --- |
| 9,228 | Great Britain | of 1911 |
| 308,573 | Great Britain | Nov. 14, 1929 |
| 486,186 | Great Britain | May 31, 1938 |